(12) United States Patent
Axmann

(10) Patent No.: US 6,907,985 B1
(45) Date of Patent: Jun. 21, 2005

(54) DEVICE FOR CONVEYING PIECE GOODS

(75) Inventor: Norbert Axmann, Sinsheim (DE)

(73) Assignee: Interroll (Schweiz) AG, Sant'Antonino (CH)

(*) Notice: Subject to any disclaimer, the term of this patent is extended or adjusted under 35 U.S.C. 154(b) by 71 days.

(21) Appl. No.: 10/601,388

(22) Filed: Jun. 23, 2003

(30) Foreign Application Priority Data

Jun. 22, 2002 (DE) .......................................... 102 27 998

(51) Int. Cl.⁷ ............................................. B65G 23/14
(52) U.S. Cl. .................................... 198/833; 198/370.1
(58) Field of Search .......................... 198/370.08, 370.1, 198/832, 833, 834, 835, 838, 844.1, 845; 209/922

(56) References Cited

U.S. PATENT DOCUMENTS

| | | | | |
|---|---|---|---|---|
| 2,759,595 A | * | 8/1956 | Lauenstein ................... | 198/830 |
| 2,868,356 A | * | 1/1959 | Haaff .......................... | 198/833 |
| 3,211,279 A | * | 10/1965 | Smith .......................... | 198/793 |
| 3,338,380 A | | 8/1967 | Grebe | |
| 3,711,161 A | * | 1/1973 | Proctor et al. .............. | 299/82.1 |
| 3,788,455 A | | 1/1974 | Dieckmann, Jr. | |
| 3,910,406 A | * | 10/1975 | Pulver et al. ................ | 198/833 |
| 5,303,817 A | * | 4/1994 | Kissee ......................... | 198/833 |
| 5,445,081 A | * | 8/1995 | Kunczynski ................. | 104/165 |

FOREIGN PATENT DOCUMENTS

| | | |
|---|---|---|
| DE | 644 A | 2/1951 |
| DE | 932 418 | 9/1955 |
| DE | 1 004 546 | 8/1957 |
| DE | 1 099 936 | 2/1961 |
| DE | 29 05313 | 8/1979 |
| DE | 24 09 958 | 4/1980 |
| DE | 32 29 061 | 2/1984 |
| DE | 34 37 049 | 5/1985 |
| DE | 35 00 704 | 8/1985 |
| DE | 42 44 170 | 6/1994 |
| DE | 198 01 706 | 7/1999 |
| DE | 100 13 332 | 7/2000 |
| DE | 199 49 690 | 4/2001 |
| DE | 19957841 | 6/2001 |
| EP | 0611713 | 8/1994 |
| EP | 0662433 | 7/1995 |
| FR | 2307729 | 11/1976 |
| GB | 2140371 | 11/1984 |

* cited by examiner

*Primary Examiner*—Donald P. Walsh
*Assistant Examiner*—Joseph Rodriguez
(74) *Attorney, Agent, or Firm*—Collard & Roe, P.C.

(57) ABSTRACT

A device for conveying piece goods. The device comprises a sorting system for sorting the piece goods. The successively arranged conveying systems are guided with this device along a conveying line and can be driven by at least one driving means that engages a driving belt. In a first embodiment, there is a driving belt on the driving side and a driving belt on the driven side which each comprise a rubber chain comprising a toothed profile. The toothed profiles of both rubber chains are in a substantially similar form. The device can also have a driving belt that is clamped in a fixed manner between the clamping jaws of the rigid clamping profiles. These clamping jaws extend at least substantially over the entire length of respective conveying system or sorting system. Furthermore, the non-clamped length of driving belt between the successively disposed conveying systems is much shorter than the length of the clamping profiles.

9 Claims, 10 Drawing Sheets

DEVICE FOR CONVEYING PIECE GOODS

CROSS REFERENCE TO RELATED APPLICATIONS

Applicant claims priority under 35 U.S.C. §119 of Jun. 22, 2002 Application No. DE 102 27 998.5-22 filed Jun. 22, 2002.

BACKGROUND OF THE INVENTION

The invention relates to a device for conveying piece goods, in particular to a device for conveying and sorting piece goods. In connection with this device, successively installed conveying and sorting systems are arranged along a conveying and sorting line and can be driven by at least one driving means that revolves along the conveying and sorting line. This revolving driving means is secured on the conveying systems and engages a driving belt that is secured on the conveying systems.

A large number of conveying devices which are equipped both with and without sorting systems are known. These conveying devices often form a revolving, endless system. Predominantly, chains or V-belts serving as the tensile and supporting elements are used in this design serving as the endless conveying means. These devices have become known, for example from DE 198 01,706 A and DE 100 13 332 A incorporated herein by reference.

A transporting and sorting device of the type specified above has become known from DE 29 05 313 C2 incorporated herein by reference. In connection with this device, successively arranged transport carriages are driven by means of a plurality of friction wheels that engage a special driving belt, which revolves along the conveying line and is secured on the transport carriages.

This construction is expensive and leads to increased wear, and a comparatively high level of noise. For this reason, this construction has found no application in practical life.

Accordingly, the problem of the invention is to provide a device for conveying piece goods, in particular a device for conveying and sorting piece goods that permits a trouble-free operation at a low level of noise, as well as favorable conveying conditions in particular in with long revolving conveyor systems and long conveyor lines and high conveying loads or tensile forces and/or at elevated temperatures.

SUMMARY OF THE INVENTION

In one embodiment of the invention, the driving belt can have rotating bodies on the driving side. These rotating bodies rotate perpendicular in relation to the longitudinal expanse of the driving belt on the driven side, and are secured on the driving belt on the driving side, and are spaced apart from, each other in the longitudinal direction. As the driving belt is being driven on the driven side by means of the driving side driving belt, these rotating bodies are actively connected with the teeth of the toothed profile of the driving side driving belt, and are capable of rolling off on the flanks of such teeth. Thus, this design reduces the operating noise and wear. This results in particularly favorable conditions for transmitting the force, as well as possibilities for transmitting higher forces. This is because the design includes a plurality of rotating bodies or joints of the driving side driving belt, wherein a plurality of teeth of the driving belt on the driven side engage one another in a force transmission area or contact region, by substantially arranging the two driving belts in parallel with each other.

In another embodiment, the driving belt is clamped in a fixed manner between the clamping jaws of the rigid clamping profiles, which at least substantially extend over the entire length of the respective conveying system or sorting system, and wherein the length of the driving belt that is not clamped in between successive conveying systems, is substantially shorter than the length of the clamping profiles.

The expansion of the driving belt can be reduced by these measures to a minimum, which ensures a trouble-free and low-maintenance operation at a low level of noise of the conveying device. In addition, this also leads to favorable conveying and driving conditions over a long period of time. Therefore, with this alternative of the solution, the aim is to keep the areas of the flexible driving belt that are present between the individual conveying systems and sorting systems, as small as possible. These areas permit a favorable mobility of these device in relation to each other both in the horizontal and vertical directions. In addition, these areas can be kept as small as possible by fixing the driving belt in the other areas by means of the rigid clamping profiles in a clamped manner, so that the expansion of the driving belt in these areas corresponds with the expansion of the rigid clamping profiles.

The expansion occurs in the remaining, short transition areas of the driving belt and is negligible in practical applications even when associated long conveying lines. Thus, it is possible to operate conveying devices and conveying and sorting systems that also comprise long conveying lines of, for example of 200 to 300 meters, at a low level of noise and with a minor amount of maintenance, and to control such devices and systems three-dimensionally in quasi or any desired manner as well.

It is a benefit offered by both alternatives of the solution that it is possible to use a flexible driving belt to integrate two important functions in one single element The first function of the driving belt is to connect the conveying and sorting systems with each other. The second function of the driving belt is to function as a driving means.

Another advantage of the invention is that the driving belt does not have to be made endless at the point Of the joint, but that both ends can be clamped in on the clamping profiles so that these ends rest against each other in a butt-joined way. In the clamped-in condition, the clamping forces acting between the clamping jaws, which oppose each other, and can consequently ensure not only the connection between the individual conveying and sorting systems and the driving belt. These clamping forces can also be used for creating an inexpensive, a particularly simple connection of the ends of the driving belt to form an endless belt. Thus, it is possible to obtain a particularly flexible application of all kinds of different constructions.

The driving belt, and consequently also the conveying device and the conveying and sorting systems, are usefully driven with the help of a friction wheel drive that is preferably realized in the form of the type of the proportional drive that is already known from DE 42 44 170 C2 incorporated herein by reference.

In another variation of the second alternative of the solution, the driving belt can be formed as a flat, flexible belt which, is reinforced with a tensile element of high strength that is extended all around in the area where its edge is clamped in a fixed manner by the clamping jaws of the respective clamping profile. Accordingly, in another beneficial embodiment of the first alternative of the solution, the driving belts are each reinforced with a tensile element of high strength that extends all around or all through. A steel cable comprised of stranded steel wire can preferably be used in each case for this purpose. On the other hand, the belt surrounding the tensile element, as in the case where no such reinforcement is used, preferably consists of a plurality of layers of fabric, for example of a polyester fabric. These layers comprise intermediate and cover layers as well. The layers, which point away from each other and form the external surface of the driving belt, preferably consist of polyurethane. Such a driving belt is flexible like the shafts for a horse. The above measures permit particularly favorable clamping conditions to be obtained and even more flexible movements in the vertical direction. The length of the belt corresponds with the overall length of the conveying line.

Another beneficial feature of both alternatives of the solution, provides that the clamping profiles can be formed as long-stretching clamping bars that extend in parallel with the driving belt. The clamping jaws of these clamping bars extend substantially over the total length of the clamping bars. Thus, in the clamped, fixed condition, the clamping jaws solidly abut or clamp substantially over the entire length of the clamping bars. This, in turn, means that further enhanced conveying and driving conditions are achieved, and that the maintenance intervals are also prolonged.

In another beneficial variation of both alternatives of the solution, the conveying systems can be formed as traveling carriages equipped with running rollers that are guided on a preferably central guide rail of the conveying line, which is arranged in the area of the transverse center of the respective conveying and sorting system, and which extends in the direction of conveyance. It is thus possible to always achieve constantly good guiding conditions, combined with favorable construction possibilities and low manufacturing tolerances, also when confronted with difficult conditions of curves, and even with conveying lines that intersect each other. Furthermore, it is possible by means of the measures specified above, to adjust in a simple manner a slanted position or inclination of the conveying system that is flexibly adapted to the application and user requirements, if necessary jointly with the sorting system, to be able to compensate for the centrifugal forces occurring when traveling through curved sections of the conveying line.

The traveling carriage can be is guided via at least three running rollers that are arranged at an angle of preferably 120 degrees around the longitudinal axis of the guide rail. This permits particularly favorable guiding and conveying conditions, along with a low-noise and low-maintenance operation over a long period of time. The running rollers can be formed as an arrangement gripping (or extending) around the guide rail, so that it is possible to support both the weight of the traveling carriage and to obtain support for the traveling carriage versus the force of gravity. This permits safe guidance and conveyance of the traveling carriages, if need be also when the traveling carriages are in a position that is inclined versus the horizontal line. This design makes the device able to satisfy the requirements to be met with respect to difficult conditions in curves in particular in the presence of elevated conveyance capacities.

Thus, it is beneficial, furthermore, if the guide rail is formed as a guide tube that has a circular cross-section, so that the traveling carriage guided on the guide rail can be substantially freely rotated at least in part areas around the longitudinal axis of the guide rail. Any desired angles of inclination of the traveling carriage around the longitudinal axis of the guide rail can be adjusted, in a useful manner in conjunction with another guide rail that extends along the central guide rail with a spacing from that guide rail. At least one running roller and preferably at least two running rollers are guided on the other guide rail. These running rollers can rotate around axles of rotation that are connected with the traveling carriage in a fixed manner.

It is understood that the measures specified above can be combined in any desired manner as well within the scope of feasibility.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
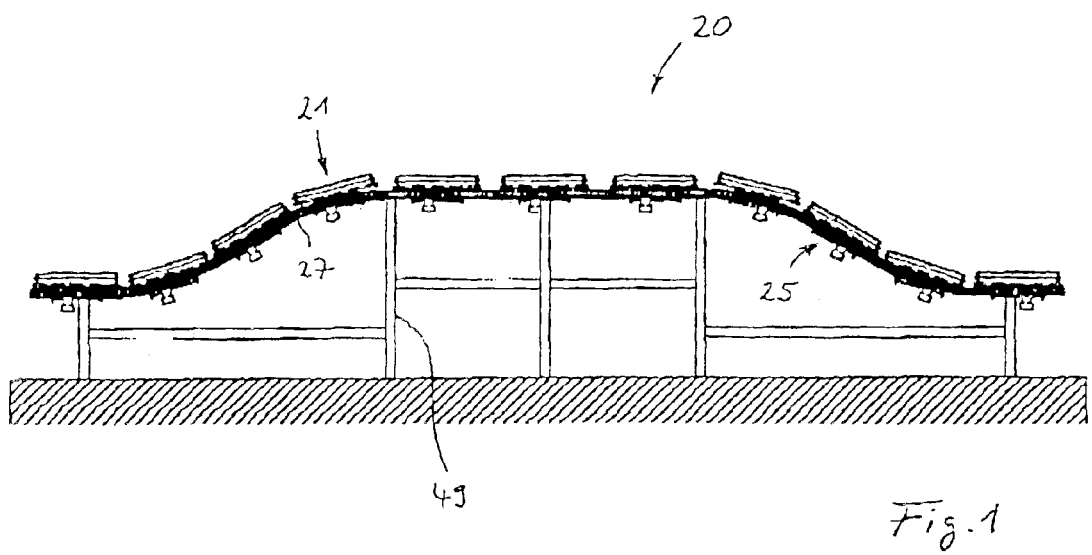
FIG. 1 shows, by a cutout, a side view of the guidance system comprising conveying and sorting systems that are coupled to each other via a driving belt in different planes of a vertical line.
Figure 2:
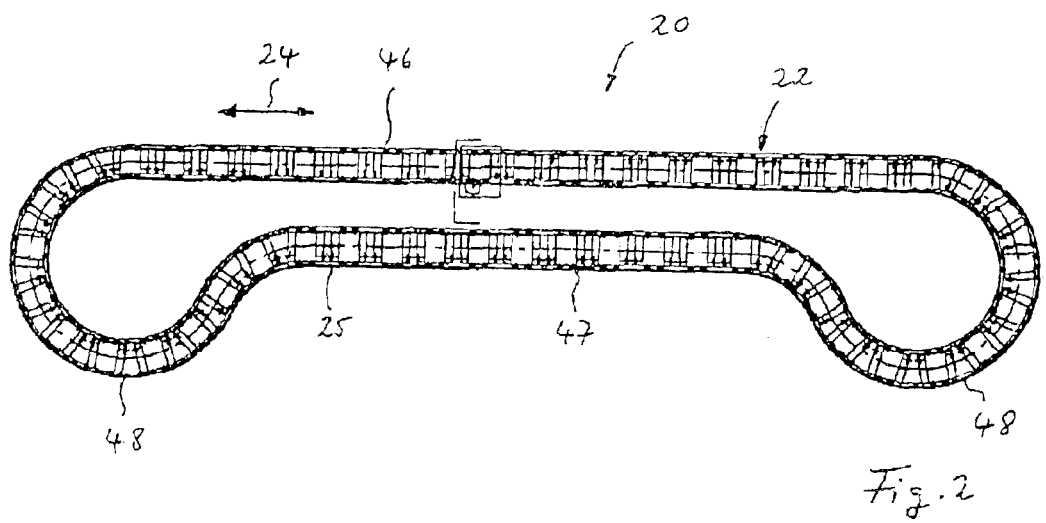
FIG. 2 is a top view of a device for conveying and sorting piece goods, as shown in FIG. 1, with a special curved course of the line.
Figure 3:
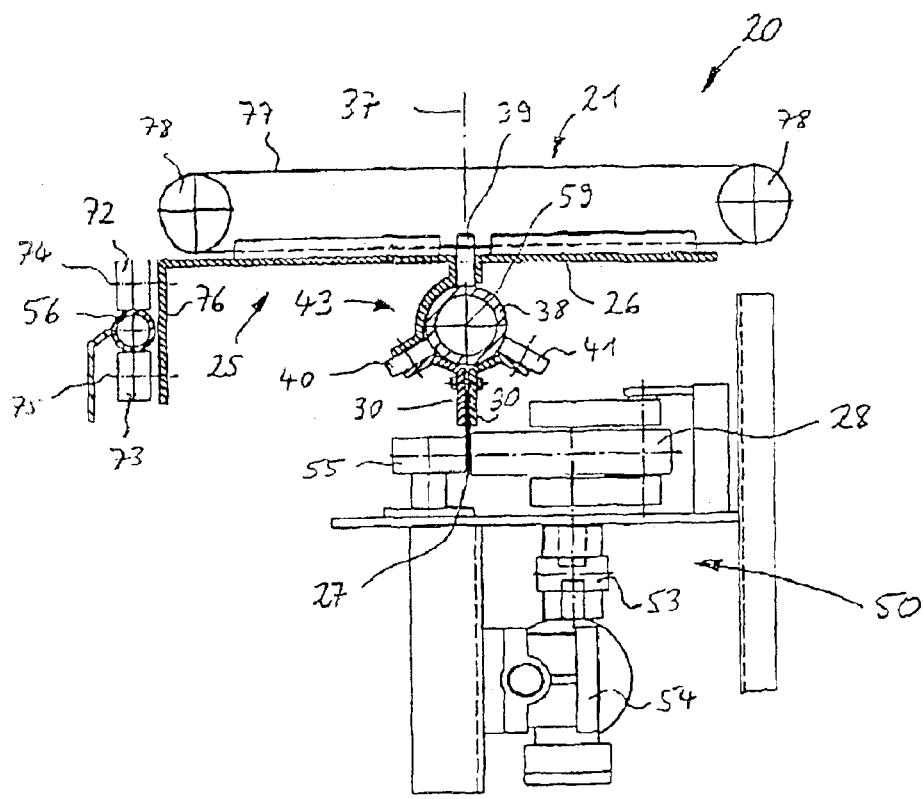
FIG. 3 is a cross-section through the conveying and sorting system in the area of the friction wheel drive.

Referring in detail to the drawings, FIG. 1, FIG. 2 and FIG. 3 show device 20, which serves for conveying piece goods and, in the present case, is comprised of a sorting system 21 for distributing out or sorting the pieced goods in a targeted manner. With this design, the successively arranged conveying systems 25 in the form of traveling carriages 26 (SEE FIG. 3) and are guided along a conveying line 22 (FIG. 2), which, in the present case, forms a sorting line as well. Sorting systems 21 are secured on traveling carriages 26 and each comprise a rubber belt 77 (FIG. 3) that can be driven transversely in relation to conveying line 22 or transversely to the sorting line. Rubber belt 77 is guided in each case via a set of reversing rollers 78, with axles of rotation that extends in conveying direction 24. The transverse drive of rubber belts 77 of sorting systems 21 occurs by using a driving means that can be selectively caused to cooperate. These driving means are not shown in any detail in the figures.

Device 20 has a conveying and sorting line 22 that is closed within itself, as it is shown in particular in FIG. 2. Conveying and sorting line 22 shown in this figure comprises two straight-line conveying and sorting sections 46 and 47, namely the curved conveying and sorting sections 48 that connect sections 46 and 47 with each other. In the present case, these sections are formed as an approximate of a three-quarter circle. As shown in FIG. 1, not only horizontal conveying and sorting lines can formed with the device as defined by the invention, but also vertically ascending or descending sections, and even sections that intersect one another. Therefore, it is possible to form conveying and sorting lines that can be arranged in quasi or in any desired way in the three-dimensional space.

Traveling carriages 26 of conveying systems 25 are designed with plate-shaped, profiled components for receiving and securing sorting systems 21, and comprise a lateral, beveled and profiled component 26. At least one pair of rollers which comprise two oppositely arranged running rollers 72 and 73 are connected with torsional strength on lateral, profiled component 76 via rotational axles 74 and 75, respectively. Axles 74 and 75 extend in parallel in the present case, whereby running rollers 72 and 73 receive a lateral guide rail 56 between each other and are guided on this guide rail. Lateral guide rail 56 is formed as a guide tube 71, which has a circular cross-section.

Furthermore, in a region of their transverse centers, or in the transverse center 37 of the respective conveying system 25, traveling carriages 26 comprise two arrangements 43 that are spaced apart from each other in conveying direction 24. In the present case, these arrangements each comprise three running rollers 39, 40 and 41. Running rollers 39, 40 and 41 grip or extend around a central guide rail 38 so that both the weight of traveling carriage 26 is supported and a support of the traveling carriage 26 against the force of gravity is achieved as well. Thus, running rollers 39, 40 and 41, or their respective axles of rotation are, in the present case, arranged at an angle 42 of about 120 degrees around the longitudinal axis 59 of the central guide rail 38, so that guide rail 38, which is formed as a guide tube 44 with an external circular cross-section 45, is engaged by running rollers 39, 40 and 41 in a form-locked manner.

Figure 9:
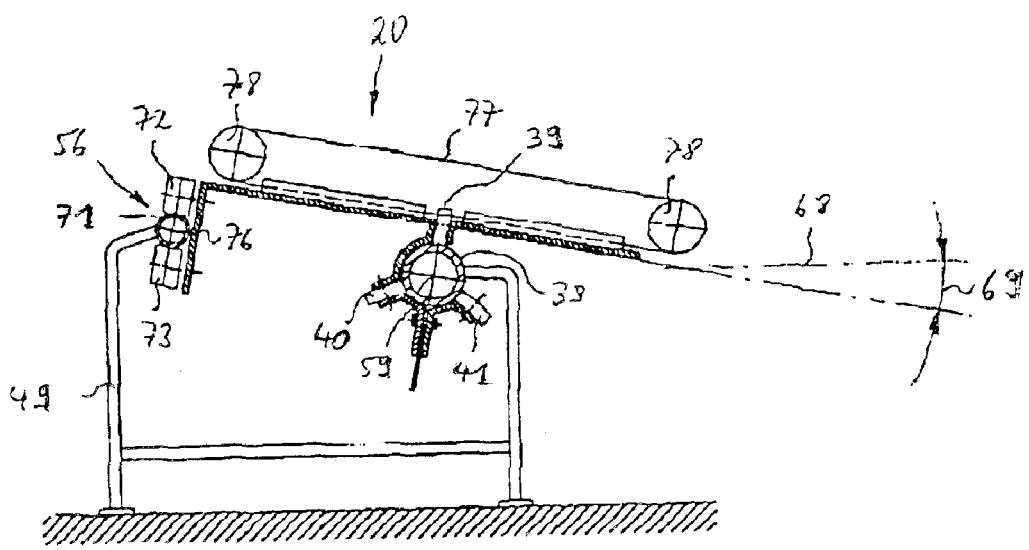
FIG. 9 is a cross-section through the conveying and sorting device comprising a conveying and sorting system that is inclined at a defined angle of inclination in relation to the horizontal line.

One important feature of this invention is that the traveling carriages 26 are guided on a central guide rail 38 via running rollers 39, 40 and 41. Central guide rail (38) is arranged in the area of transverse center 37 of the respective conveying system 25 or traveling carriages 26, and extends in conveying direction 24. Due to the measures specified above, conveying systems 25 with their sorting systems 21 are capable of rotating or tilting substantially freely around longitudinal axis 59 of central guide rail 38, as shown in FIG. 9 with the help of the angle of inclination 69. With one angle of inclination 69 that is desired in a given case, the vertical position of lateral guide rail 56 is adjusted in relation to central guide rail 38. In this connection, both lateral guide rail 56 and central guide rail 38 are secured in an upright framework 49.

Figure 10:
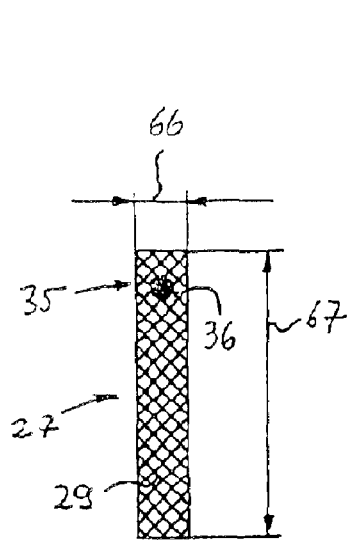
FIG. 10 is an enlarged cross-section through a driving belt equipped with a reinforcement.

Traveling carriages 26 each can be driven via a friction wheel 28 that engages a driving belt 27 that revolves along conveying line 22 and secures on traveling carriages 26. Driving belt 27 is formed as a flat, flexible belt 29 that has a rectangular cross-section. This belt has a thickness 66 and a width 67 that amounts to multiple times the thickness (FIG. 10). In this embodiment, a thickness 66 of 10 mm and a width 67 of 100 mm have been selected. The belt consists of a plurality of fabric layers made of polyester, intermediate layers, and cover layers. The external cover layers preferably consist of polyurethane.

In this case, driving belt 27, which is formed as a flexible belt 29, is clamped in a fixed manner between clamping jaws 31 of the rigid clamping profiles 30 that substantially extend over the total length 32 of the respective conveying system 25 or sorting system 21. Alternatively, driving belt 27 is clamped fixed between the clamping jaws of rigid clamping profiles, and wherein the clamped-in length of the driving belt between successively disposed conveying systems is much smaller than the length of the clamping profiles.

Figure 5:
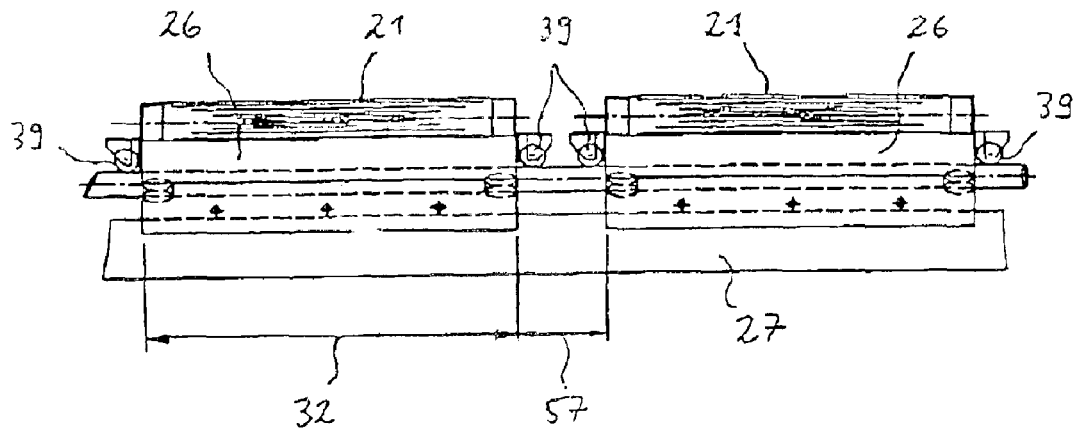
FIG. 5 is a partial side view of the device in the area of two conveying and sorting systems.
Figure 7:
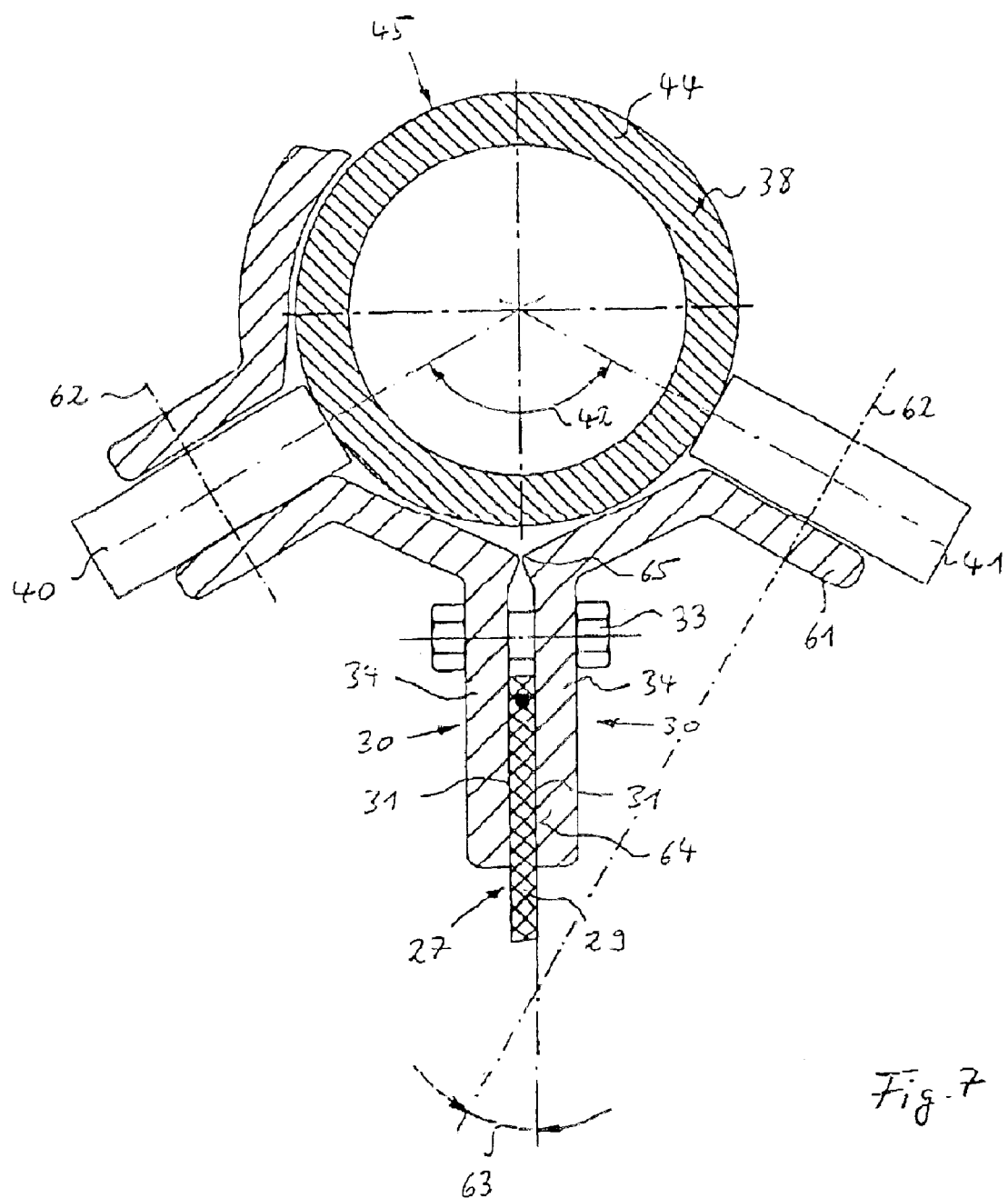
FIG. 7 is an enlarged cross-section in the area of the clamping profiles.

In the present embodiment, two clamping profiles 30 are formed as long-stretching clamping bars 34 that extend in parallel with driving belt 27. The clamping jaws 31 of these clamping bars substantially extend over the entire length 32 (FIG. 5). FIG. 7 shows that clamping profiles 30 are arranged symmetrically in relation to driving belt 27, wherein these clamping profiles have an identical cross-sectional profile. This permits clamping profiles 30 which are clamped and fixed on both sides of driving belt 27 or belt 29, to be manufactured at favorable cost. Each clamping profile 30 comprises a first component of the profile that forms the respective clamping bar 34, and a second component of the profile that serves as bearing part 61 for supporting in each case a rotation axle 32 of one of the running rollers 40, 41. In this embodiment, these two components of the profile are joined with each other, forming one single piece, and also form a common, long-stretching, rigid profiled part.

In the present case, clamping jaws 31 of clamping profiles 30 are formed in a substantially flat manner over their entire length 32, so that clamping jaws 31 are capable of a plane or flat abutment with a large surface area in the area of one of the edges 35 of driving belt 27. To permit safe clamping of driving belt 27 between two clamping bars 34, each clamping bar 34 comprises a stop nose 65 that rises beyond support surface 64 of clamping jaws 31. The height of stop nose 65 above (or beyond) support surface 64 is adapted to thickness 66 of driving belt 67 so that when two clamping bars 34 are in the clamping condition, with the help of a clamping screw 33 that penetrates the two clamping bars 34, clamping jaws 31 of the clamping bars 34 will abut the side surfaces of the driving belt 27 that are pointing away from each other, with the largest possible surface area.

Figure 6:
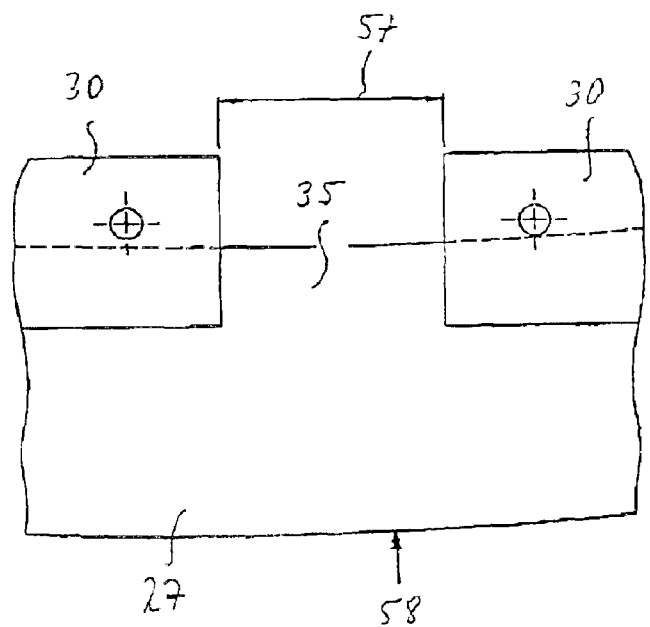
FIG. 6 is an enlarged partial side view of the device in the area of the two ends of the clamping profiles opposing each other.

As shown in FIGS. 7 and 10 driving belt 27 is formed as a flat, flexible belt 29, which, in the area of its edge 35 is clamped in a fixed manner by clamping jaws 31 of the respective clamping profile 30 and is reinforced with a revolving tensile element 36, which is formed as a steel cable of high strength formed by strands of steel wire. Thus, with this design, favorable clamping conditions can be achieved and also there can be even more flexible movements of the conveying systems 24 comprising sorting systems 21, in relation to one another. Therefore, movements in parallel with the expanse of width 67 of driving belt 27 are also possible. Driving belt 27 can be deformed in this connection, thereby forming a curved tensile line 58 (FIG. 6).

The advantageous clamping of driving belt 27 between clamping profiles 30 substantially over the entire length of conveying system 25 or sorting system 21, minimizes the free, non-clamped area of driving belt 27 between two conveying systems 24 or sorting systems 21 with one following the other. Thus, the consequence is that any changes in length or any expansion of the driving belt 27 that might occur during the operation of the device 20, can be reduced to a negligible minimum.

Figure 8:
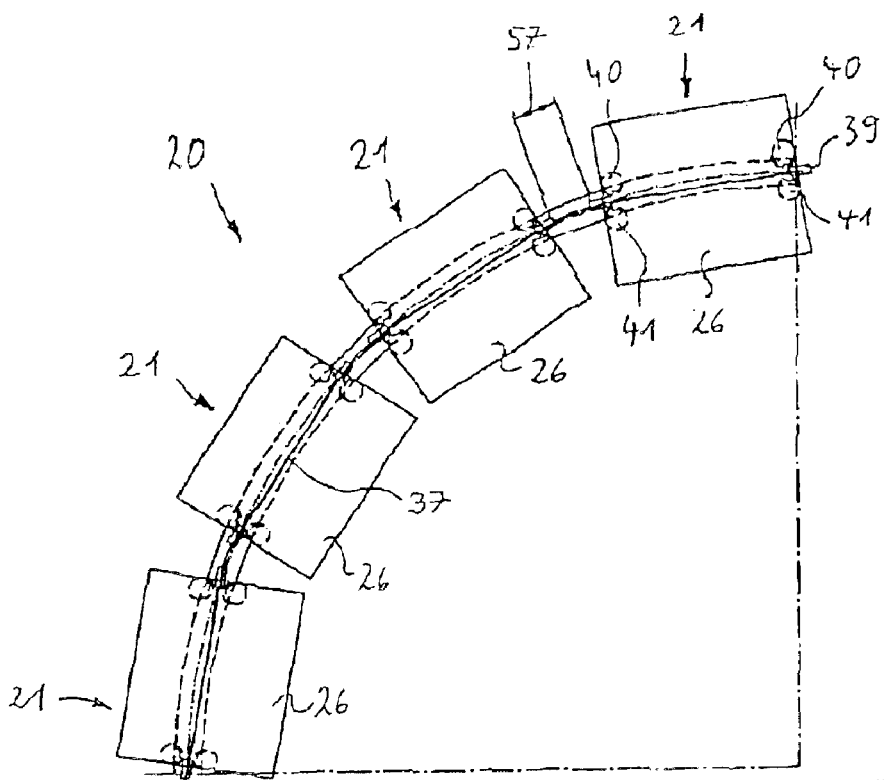
FIG. 8 is a partly schematic, enlarged partial top view of four conveying and sorting systems guided in a curve.

Because, the area of the free, untied length 57 of driving belt 27 is kept as small as possible, it is possible to form a narrow (or tight) curve radii as shown by way of example in FIG. 8, without ensuing a so-called polygonal effect, that is to say any jerky movements, or locally different conveying speeds of the traveling carriages 26.

Figure 4:
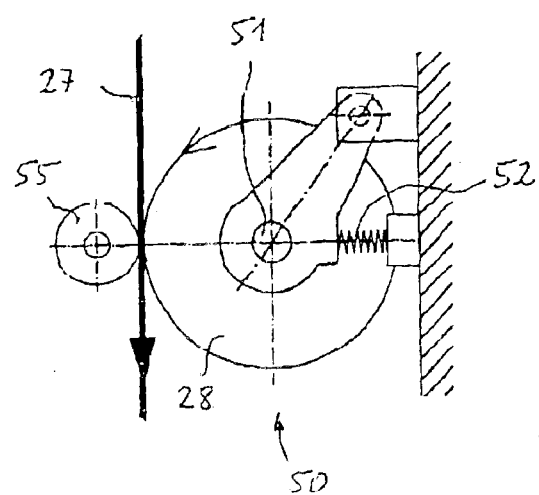
FIG. 4 is a schematic representation of the friction wheel drive formed as a proportional drive comprising a driven roller and a non-driven counter roller for supporting the forces of the contact pressure acting on the driving belt disposed between these rollers.

Traveling carriages 26 are driven via a friction surface drive 50 (FIGS. 3 and 4). This drive is a proportional drive which is already known from DE 42 44 170 C2, wherein driven friction wheel 28, which is received on a driving shaft 51 with torsional strength, is pressed against the lateral faces of driving belt 27 via pressure spring 52. Thus, friction surface drive 50 comprises a counter wheel 55 that is disposed opposite driven friction wheel 28, whereby in the present case, the axles of rotation of friction wheel 28 and the counter wheel 55 are arranged in parallel to each other and in a plane extending perpendicular to driving belt 27. Driving belt 27 is guided between the counter wheel 55 and friction wheel 28. The proportional drive is designed so that the force of the contact pressure exerted by friction wheel 28 on driving belt 27 varies depending on the driving force to be transmitted to driving belt 27. Such proportional drives generate a largely slip-free drive. Driving shaft 51, which receives friction wheel 28 with torsional strength, is in driving connection with an electric drive motor 54 via a transmission 53. Transmission 53, with drive motor 54 flanged to it, is supported on the upright framework 49 that receives guide rails 38 and 56 for guiding traveling carriages 26.

With long conveying lines 22 or sorting lines, it is possible to have more than one friction surface drive to ensure that the overall system is stressed in an even manner.

FIGS. 11 to 20 show another embodiment of device 20, with an alternative drive 80 that comprises two belts, a driving belt 81 and a driven belt 82, which are also known as driving belt 81 on the driving side and driving belt 82 on the driven side, which engage one another in a form-locked manner. Accordingly, the invention also relates to a device for conveying parceled goods that preferably contains a sorting system 21 for sorting the piece goods. With this device, the successively arranged conveying systems successively are guided along a conveying line 22 and can be driven via at least one driving means, such as driving belt 81, that revolves along conveying line 22. This driving means engages driven belt 82 that is secured on conveying systems 25 This variation of the embodiment is in the form where driving belt 81 and driven belt 82 are each formed with a rubber chain 83.1, 83.2. These rubber chains each contain a toothed profile 84.1, 84.2, respectively, whereby toothed profile 84.1 of driving belt 81 on the driving side, and toothed profile 84.2 of driving belt 82 on the driven side are substantially the same, or designed in the same way.

Figure 11:
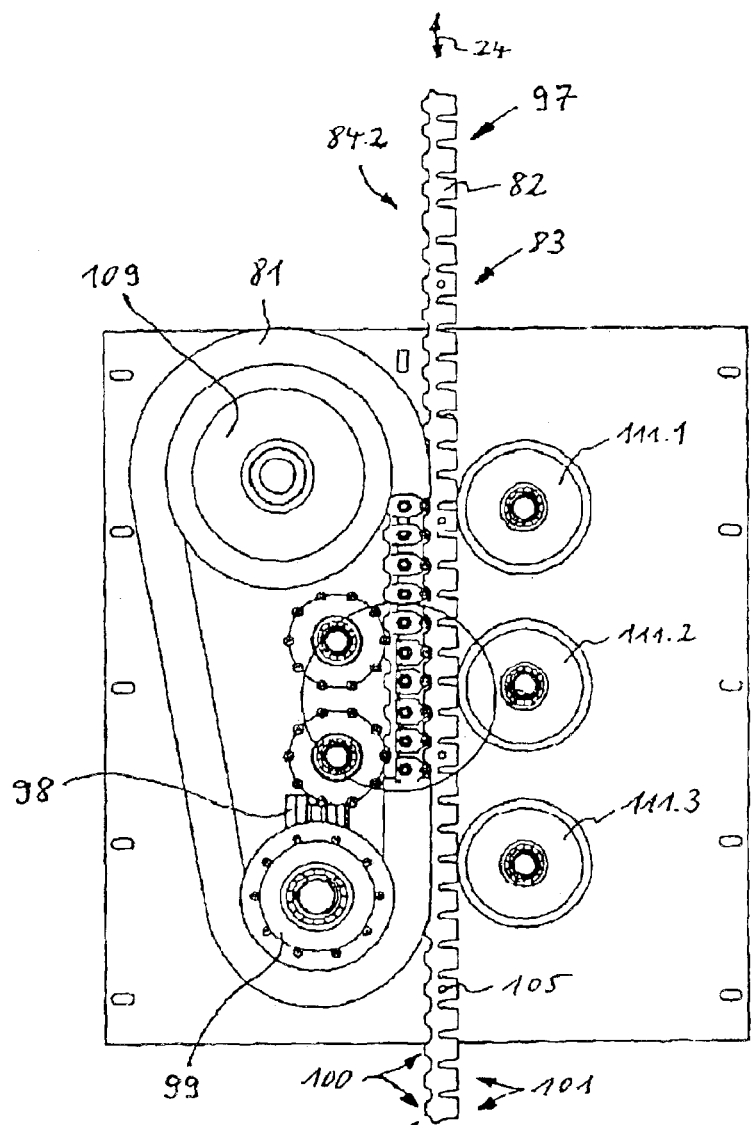
FIG. 11 is a top view of a drive comprising a rubber chain on the driving side, and a rubber chain on the driven side for driving conveying systems.

FIG. 11 shows that drive 80 comprises a motor 98 that drives a rotatable drive wheel 99. Drive wheel 99 drives driving belt 81 on the driving side and comprises a rubber chain 83.1 and represents an endless driving means. With this design, rubber chain 83.1 on the driving side is reversed in this connection around a reversing wheel 109, and is actively connected with a rubber chain 83.2 on the driven side, which is driven by the rubber chain 83.1 on the driving side. This rubber chain on the driven side is secured on conveying systems 25 with the help of suitable fastening means. Similar to driving belt 27, driving belt 82 on the driven side is also in a form of an endless conveying means.

Rubber chain 83.1 on the driving side and rubber chain 83.2 on the driven side are designed in the same way regarding the structure of their toothed profiles, and cat be described with the help of the example of the rubber chain 83 that is shown enlarged in FIG. 13 as follows:

Rubber chain 83 comprises a plurality of toothed profiles 84, 113 that extend in the direction of its longitudinal expanse and outwardly on both sides. Toothed profile 113 consists of a plurality of equally sized teeth 101, and toothed profile 84 consists of a plurality of small teeth 100. Teeth 100 and 101 each extend starting from supporting cross-section 104 of rubber chain 83, pointing away from each other and transversely outward to the longitudinal axis of rubber chain 83. Teeth 100 and 101 are each substantially equally wide, and teeth 100 and 101 are each arranged so that each base of teeth 100 is arranged in the area of the base of other teeth 101. Thin areas of rubber chain 83 are formed so that they are equally spaced from each other, where the rubber chain has a minimal supporting cross-section 104. A flexible driving means that can be three-dimensionally bent or turned is obtained in this way as well, and thus permits a corresponding movement of conveying systems 25 in three dimensions.

Large teeth can contain bores 95 and 105, which are adapted to the spacing between conveying systems 25. These drilled holes form bores 95, 105 (FIG. 12) and permit the conveying systems 25 to be secured on the driven belt with the help of suitable fastening means, or serve to secure the systems on driving belt 81 on the driving side. Both methods are explained in greater detail in the following text.

Small teeth 100 have rounded tooth flanks or notches 103, on which the circularly cylindrical rotating bodies 85 of the driving belt on the driving side are capable of executing a rolling and/or sliding movement.

Figure 14:
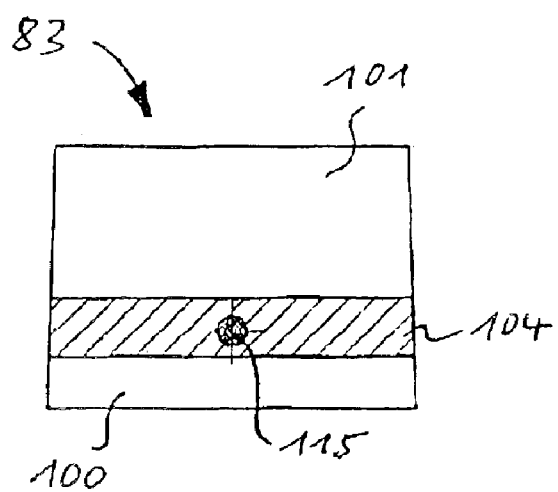
FIG. 14 is a cross-section through the rubber chain according to FIG. 13, with a section along the cutting line 14—14.
Figure 15:
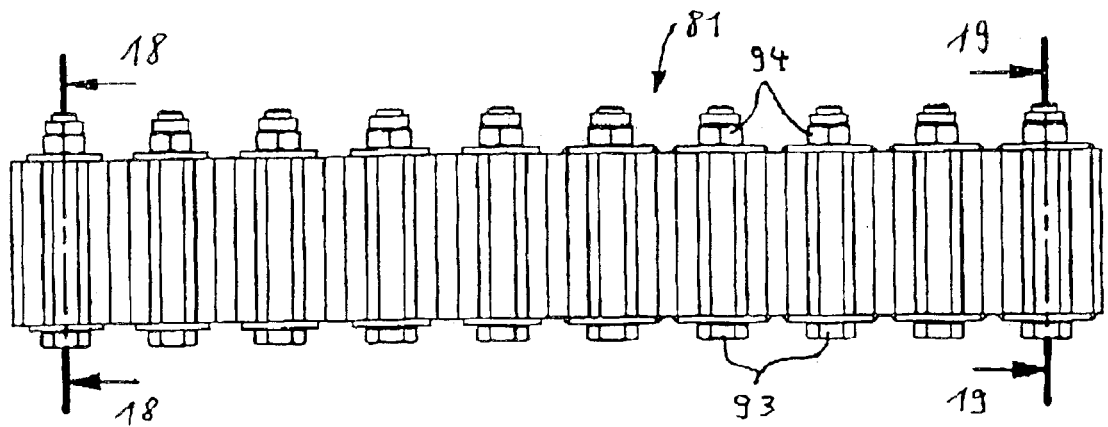
FIG. 15 is a side view of a cutout of a rubber chain on the driving side, which has rotatable rollers.

FIG. 14 shows that rubber chain 83 can be reinforced with a pulling element 115. Pulling element 115 may correspond with the design of pulling element 36. This pulling element 115 is preferably formed as stranded steel cable that is preferably arranged in the transverse center of rubber chain 83 and at the same time in about the center of supporting cross-section 104.

Figure 12:
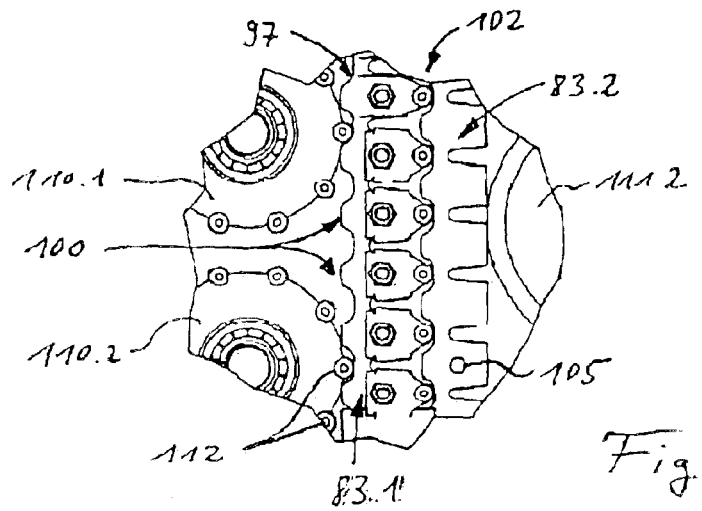
FIG. 12 is an enlarged cutout of FIG. 11 in the area of driving components that are actively connected.
Figure 13:
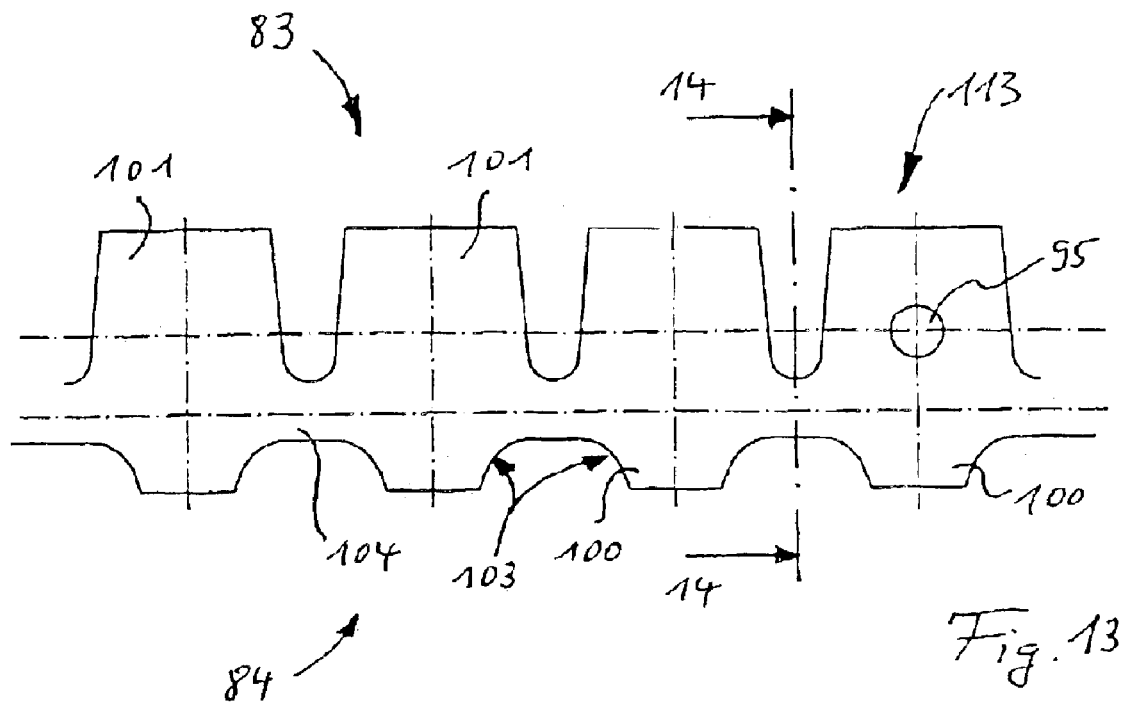
FIG. 13 is a top view of a cutout of a rubber chain that can be used for both a driving belt on the driving side and a driving belt on the driven side.

FIGS. 11 and 12 show that the design and form of rubber chain on the driven side which corresponds with the representation shown in FIG. 13, with the difference between the two designs being that rubber chain 83.1 on driving side has rotary bodies 85 in the form of the rollers 86. These rollers are capable of rotating perpendicular to the longitudinal expanse of the driven belt 82, and which are secured on rubber chain 83.1 on the driving side and spaced apart from each other in the longitudinal direction. When driven belt 82 is driven, these rotating bodies 85 are actively connected with small teeth 100 of the toothed profile 84.2 of the driving belt 82 on the driven side with the help of driving belt 81 on the driving side.

FIGS. 11 and 12 show that a plurality of rotary bodies 85 of driving belt 81 on the driving side, and a plurality of teeth 100 of the driving belt 82 on the driven side are engaged in a force transmission area 102, where the two driving belts 82 and 81 are arranged substantially parallel to each other. Thus, it is possible to transmit comparatively high forces to driving belt 82 on the driven side.

In the area of the force transmission area 102, a plurality of support and guide wheels 110 and 111 are arranged on both sides of two driving belts 110 and 111. These support and guide wheels are actively connected with the driving belts 81 and 82 on the opposite sides 96 and 97 of the driving belts 81 and 82, wherein these sides point away from each other. The driving side has two support and guide wheels 110.1 and 110.2. These wheels each comprise rotary bodies 112, which are arranged distributed over their external peripheries and spaced apart from one another. These rotating bodies are each rotatable about axes of rotation formed perpendicular to the longitudinal expanse of the driving belt 82 on the driven side, and are actively connected with teeth 100 of toothed profile 84 of driven belt 82. The spacing of rotary bodies 112 is accordingly adapted to the spacing between teeth 100.

As distinguished from the above, in the area of the force transmission area 102, the three support and guide wheels 111.1, 111.2 and 111.3 are arranged on the driving belt 82 on the driven side, resting against this belt. These support and guide wheels rest with friction grip against the outwards pointing faces of large teeth 101 of rubber chain 83.2 on the driven side.

The exact construction of the driving belt 81 on the driving side, with rubber chain 83.1, is particularly shown in FIGS. 15 to 19. As distinguished from driving belt 82 on the driven side, or driven belt 82 rubber chain 83.1 of driving belt 81 on the driving side has roller-like rotary bodies 85, whereby a rotary body 85 is associated with each large tooth 101. Each rotary body 85 comprises a driver bolt 88 with a circularly cylindrical cross-section, over which a sleeve 87 that is rotatable around an axle of rotation 92, is plugged with a low amount of clearance. Driver bolt 88 is secured at its two ends on tabs 90.1 and 90.2, respectively, via screws 89. For this purpose, these tabs each have a passage hole for respective screw 89. Tabs 90.1 and 90.2 are made of a material with greater strength than the rubber of rubber chain 83.1, and preferably consist of metal. Tabs 90.1 and 90.2 are formed as flat plates that are fastened on the face sides of large teeth 101 pointing away from each other, and which rest against these face sides. A screw 93 serves to secure the plates. This screw can be plugged through fitting passage bores of the respective tab 90.1 and 90.2, as well as passed through bores 105 provided in the area of large teeth 101, whereby screws 93 are secured with the help of nuts 94.

Figure 16:
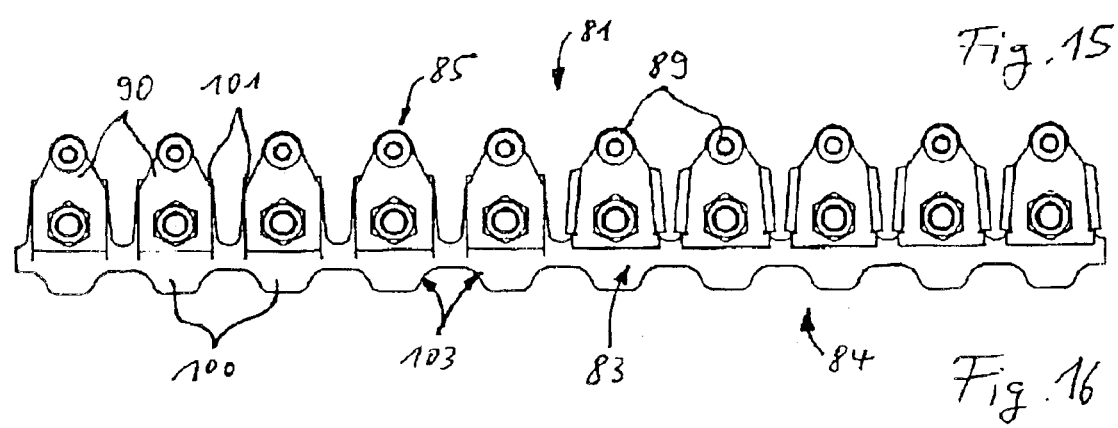
FIG. 16 is atop view of a cutout of the rubber chain according to FIG. 15.
Figure 17:
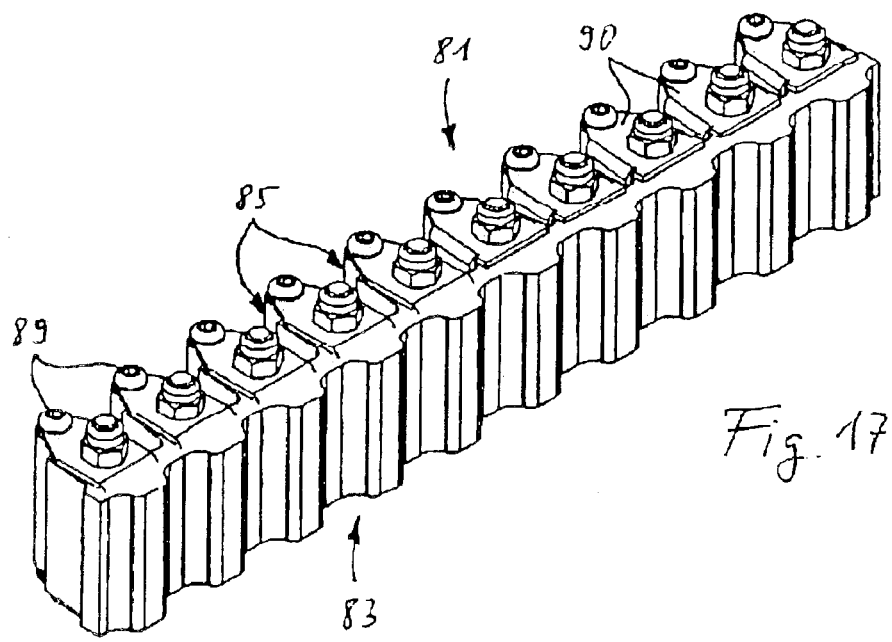
FIG. 17 is a three-dimensional representation of the cutout of the rubber chain according to FIGS. 15 and 16.
Figure 18:
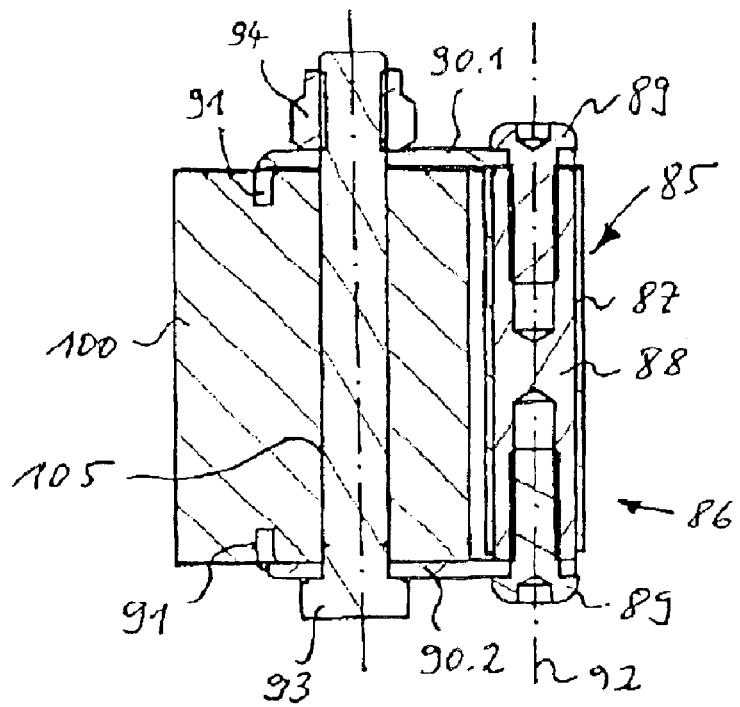
FIG. 18 is a cross-section through the rubber chain according to FIG. 15, with a section along the cutting line 18—18.
Figure 19:
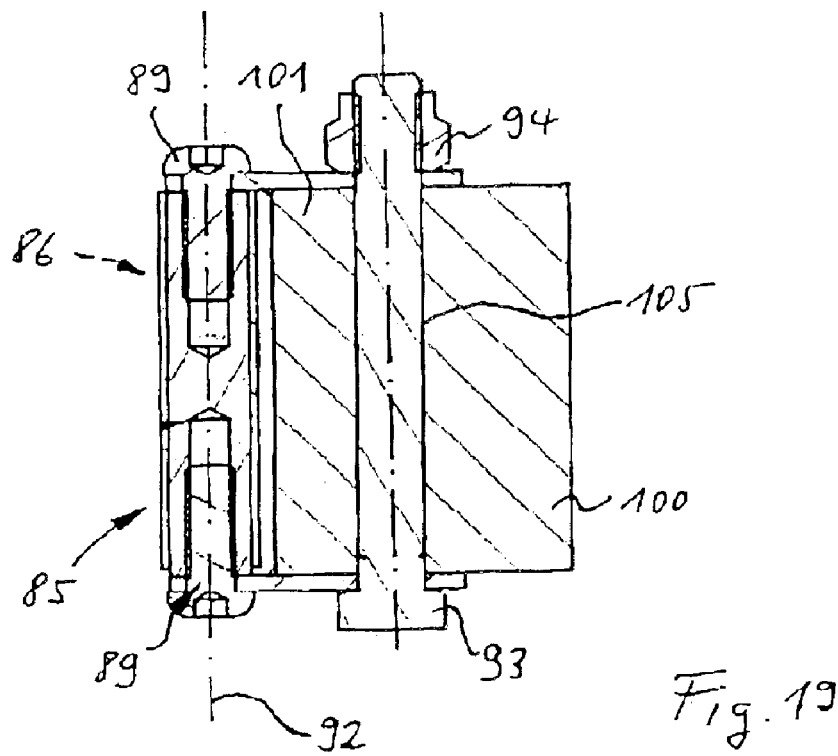
FIG. 19 is a cross-section through the rubber chain according to FIG. 15, with a section along the cutting line 19—19.

At its end pointing away from rotary body 85, each tab 90.1 and 90.2 comprises a fastening profile (or section) and extends transversely in relation to the remaining plane of the tab. In this embodiment, this fastening profile has prongs 91, whereby a plurality of prongs 91, which are disposed next to each other, form a saw tooth-like fastening profile (or section). When the two tabs 90.1 and 90.2 are clamped tight with the help of screw 93 and nut 94, these prongs 91 are pressed into the relatively soft rubber material of rubber chain 83.1, so that it is possible to create a stable positioning of tabs 90.1 and 90.2 in relation to the rubber chain 83.1. In addition, a form-locked support can be obtained with the help of the edge legs that extend laterally on both sides of each tab 90.1, 90.2 substantially perpendicular to the main plane of these tabs. The edge legs may rest against the respective vertical outer edges of the large teeth 101, as shown in FIGS. 16 and 17 on the example of the five tabs 90 arranged on the outside on the right hand.

Figure 20:
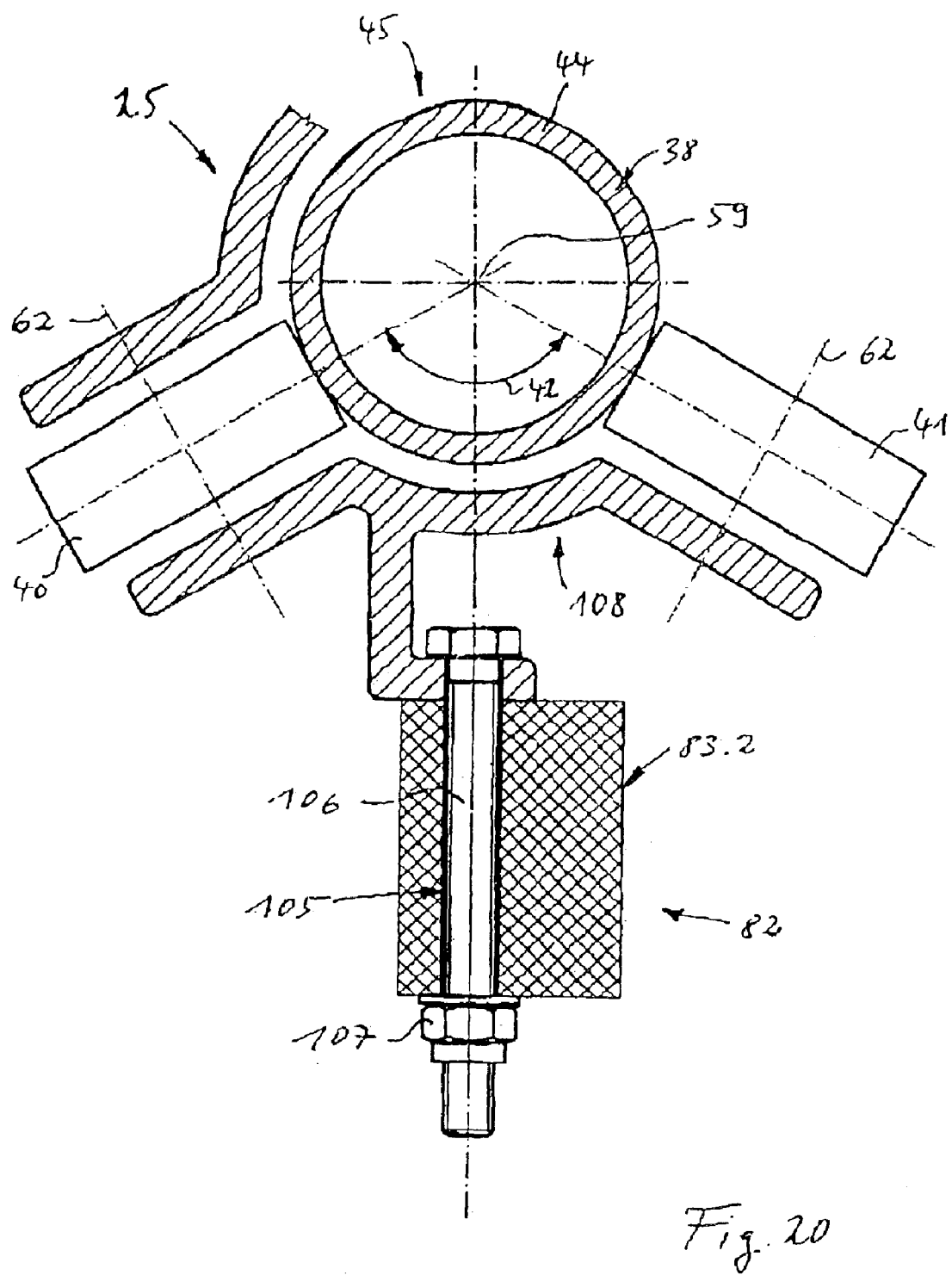
FIG. 20 is an enlarged cross-section in the area of a guide tube corresponding with the representation according to FIG. 7, for clearly showing the fastening of the driving belt on the driven side on one of the conveying systems that is formed as a traveling carriage.

FIG. 20 shows the fastening of driving belt 82 on the driven side, for example, how rubber chain 83.2 is secured on the respective conveying system 25. In this connection, those elements that are shown in FIGS. 1 to 9, and in particular in FIG. 7, and are described in the text above, have the same reference numerals. To secure the rubber chain 83.2 on the driven side, it is possible to use a screw 106, which is inserted through passage hole of a bearing and fastening leg 108. Rubber chain 83.2 can then be plugged onto screw 106 so inserted, whereby screw 106 is then plugged through the associated passage bore 105. A nut 107 can then be screwed to the screw 106 for securing and fixing the rubber chain.

It is understood that the embodiments and arrangements shown in FIGS. 1 to 9 and described above can be combined in any desired way within the framework of feasibility with the embodiments and arrangements shown in FIGS. 11 to 20 and described above as well.

Accordingly, while at least embodiment of the present invention have been shown and described, it is obvious that many changes and modifications may be made thereunto without departing from the spirit and scope of the invention.

What is claimed is:

1. A device for conveying and sorting piece goods that is driven by at least one drive, the device comprising:

a) at least one driving belt which is coupled to and driven by the at least one drive, in a positive-locked manner, said at least one driving belt comprising a rubber chain having a toothed profile;

b) at least one driven belt comprising a rubber chain having a toothed profile that is substantially similar to said toothed profile for said at least one driving belt; and c) a plurality of successively installed conveying systems, coupled to and driven by said at least one driven belt, said plurality of successively installed conveying systems for conveying and supporting the piece goods.

2. The device as in claim 1, wherein said at least one driving belt further comprises a plurality of rotary bodies adapted to rotate around axes of rotation formed perpendicular to a longitudinal expanse of said at least one driven belt wherein said rotary bodies are secured in said at least one driven belt and wherein said at least one driven belt further comprises a plurality of teeth wherein said plurality of teeth interact with said plurality of rotary bodies of said at least one driving belt so that said at least one driving belt can drive said at least one driven belt.

3. The device as in claim 2, wherein the device contains a force transmission area and wherein said at least one driving belt and said at least one driven belt are arranged parallel to each other so that said plurality of teeth engage with said plurality of rotary bodies in said force transmission area.

4. The device as in claim 3, wherein the device further comprises at least one support and guide wheel coupled to said at least one driving belt, and at least one additional support and guide wheel coupled to said at least one driven belt, and wherein said support and guide wheels being positioned pointing away from each other.

5. The device as in claim 4, wherein said at least one support and guide wheel comprises a plurality of rotary bodies which are spaced-apart from each other, wherein said plurality of rotary bodies are adapted to rotate around axles of rotation formed perpendicular to the longitudinal expanse of said at least one driving belt wherein said plurality of rotary bodies are actively coupled to said plurality of teeth of said toothed profile of said at least one driven belt.

6. The device as in claim 4, wherein said at least one additional support and guide wheel engages said at least one driven belt in a fiction grip manner.

7. The device as in claim 1, further comprising a plurality of rigid clamping profiles, said plurality of rigid clamping profiles extending at least substantially over an entire length of the said plurality of successively installed conveying or sorting systems.

8. The device as in claim 1, further comprising a plurality of rigid clamping profiles having clamping jaws wherein said at least one driven belt is clamped in a fixed manner in said plurality of rigid clamping profiles and wherein a non-clamped length of said at least one driven belt between said conveying systems is much shorter than a length of said plurality of rigid clamping profiles.

9. The device as in claim 8, said at least one driving belt and said at least one driven belt, each further comprises a tensile element that has a relatively higher strength and extends around said at least one driving belt and said at least one driven belt.

* * * * *